(12) United States Patent
Lam et al.

(10) Patent No.: US 8,125,511 B2
(45) Date of Patent: *Feb. 28, 2012

(54) THREE-PARTY VIDEO CONFERENCE SYSTEM AND METHOD

(75) Inventors: Barry Lam, Tao Yuan Shien (TW); Chee-Chun Leung, Tao Yuan Shien (TW); Chia-Yuan Chang, Taichung (TW); Hsueh-Cheng Hsu, Tao Yuan Shien (TW)

(73) Assignee: Quanta Computer Inc. (TW)

( * ) Notice: Subject to any disclaimer, the term of this patent is extended or adjusted under 35 U.S.C. 154(b) by 1087 days.

This patent is subject to a terminal disclaimer.

(21) Appl. No.: 12/007,226

(22) Filed: Jan. 8, 2008

(65) Prior Publication Data

US 2008/0309752 A1 Dec. 18, 2008

(30) Foreign Application Priority Data

Jun. 12, 2007 (TW) .................................. 96121125 A

(51) Int. Cl.
*H04N 7/14* (2006.01)

(52) U.S. Cl. .................... 348/14.08; 348/14.09; 370/352
(58) Field of Classification Search ............... 348/14.08, 348/14.09; 370/259, 352; 709/204, 207, 709/219, 227, 230, 231
See application file for complete search history.

(56) References Cited

U.S. PATENT DOCUMENTS 7,631,039 B2 * 12/2009 Eisenberg .................... 370/259

* cited by examiner

*Primary Examiner* — Suhan Ni
(74) *Attorney, Agent, or Firm* — Thomas, Kayden, Horstemeyer & Risley, LLP.

(57) ABSTRACT

The invention provides a three-party video conference system and method. The three-party video conference system, according to the invention, uses a second terminal apparatus, which can transmit data in different protocols for receiving and transmitting the compressed digital signals transmitted from a first terminal apparatus and a third terminal apparatus. Therefore, even though the first terminal apparatus and the third terminal apparatus can not transmit compressed digital signals to each other with the same protocol, the user still can achieve three-party video conferencing communication with the three-party video conference system.

16 Claims, 6 Drawing Sheets

THREE-PARTY VIDEO CONFERENCE SYSTEM AND METHOD

BACKGROUND OF THE INVENTION

1. Field of the Invention

The invention relates to a video conference system and, more particularly, to a three-party video conference system.

2. Description of the Prior Art

Due to the development of network technology in recent years, a video conference has become an important tool for remotely communicating with each other.

However, the instant messengers in common use, such as MSN messenger, Yahoo messenger, Skype, Google Talk, iChat, and so on, usually adopt different protocols so that they are not able to communicate with each other. As a result, it becomes very inconvenient for users.

Furthermore, because the data amount of high-definition digital image signals is very large, it induces a very heavy load for computer system and communication network in the transmission and process, and instant messengers usually limit the definition of image transmission to achieve the efficacy of real-time receiving and transmitting messages. Consequently, the instant messengers usually can not achieve a high-definition video conferencing standard.

Therefore, the main scope of the invention is to provide a three-party video conference system and method to solve the aforesaid problems.

SUMMARY OF THE INVENTION

A scope of the invention is to provide a three-party video conference system and method which utilizes a second terminal apparatus, which can transmit data in different protocols for receiving and transmitting the compressed digital signals transmitted from a first terminal apparatus and a third terminal apparatus. Therefore, even though the first terminal apparatus and the third terminal apparatus can not transmit compressed digital signals to each other with the same protocol, the user still can use the three-party video conference system and method to achieve a three-party video conferencing communication.

According to an embodiment of the invention, the three-party video conference system comprises a first terminal apparatus, a second terminal apparatus, and a third terminal apparatus. The first terminal apparatus comprises a first data processing module. The second terminal apparatus comprises a second data processing module.

The first data processing module is used for executing a first instant-messaging application. Namely, the first data processing module transmits a plurality of first compressed digital signals of a first image, captured at the first terminal apparatus, via the first instant-messaging application in a first protocol through a first wideband communication channel.

The second data processing module is used for executing a second instant-messaging application, wherein the first instant-messaging application communicates with the second instant-messaging application through a network to establish a first communication link over the first wideband communication channel. Namely, the second data processing module receives those first compressed digital signals via the second instant-messaging application through the first wideband communication channel, and then transmits those first compressed digital signals and a plurality of second compressed digital signals of a second image, captured at the second terminal apparatus, via the second instant-messaging application in a second protocol through a second wideband communication channel.

The third terminal apparatus is capable of establishing a second communication link with the second terminal apparatus over the second wideband communication channel, wherein the third terminal apparatus receives those first compressed digital signals and those second compressed digital signals through the second wideband communication channel, and then transmits a plurality of third compressed digital signals of a third image, captured at the third terminal apparatus in the second protocol through the second wideband communication channel. Namely, the second data processing module receives those third compressed digital signals via the second instant-messaging application through the second wideband communication channel, and then transmits those second compressed digital signals and those third compressed digital signals via the second instant-messaging application in the first protocol through the first wideband communication channel. Afterward, the first data processing module receives those second compressed digital signals and those third compressed digital signals via the first instant-messaging application through the first wideband communication channel.

According to an embodiment of the invention, the three-party video conference method comprises the following steps. First of all, at the first terminal, a first instant-messaging application is executed. Then, a plurality of first compressed digital image signals of a first image, captured at the first terminal, and is transmitted via the first instant-messaging application in a first protocol through a first wideband communication channel.

Afterward, at second terminal, a second instant-messaging application is executed, wherein the first instant-messaging application communicates with the second instant-messaging application through a network to establish a first communication link over the first wideband communication channel. At the second terminal, those first compressed digital signals are received via the second instant-messaging application through the first wideband communication channel and those first compressed digital signals and a plurality of second compressed digital signals of a second image, captured at the second terminal, are transmitted via the second instant-messaging application in a second protocol through a second wideband communication channel.

Afterward, at the third terminal, a second communication link is established between the second terminal and the third terminal over the second wideband communication channel. Those first compressed digital signals and those second compressed digital signals are received through the second wideband communication channel. Finally, a plurality of third compressed digital signals of a third image captured at the third terminal is transmitted in the second protocol through the second wideband communication channel.

According to the invention, the three-party video conference system and method utilize a second terminal apparatus, which can transmit data in different protocols, for receiving and transmitting the compressed digital signals transmitted from a first terminal apparatus and a third terminal apparatus. Therefore, even though the first terminal apparatus and the third terminal apparatus can not transmit compressed digital signals to each other with the same protocol, the user still can use the three-party video conference system to achieve a three-party video conferencing communication.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a three-party video conference system and method which utilize a second terminal apparatus, which can transmit data in different protocols for receiving and transmitting the compressed digital signals transmitted from a first terminal apparatus and a third terminal apparatus. Therefore, even though the first terminal apparatus and the third terminal apparatus can not transmit compressed digital signals to each other with the same protocol, the user still can use the three-party video conference system to achieve a three-party video conferencing communication.

Figure 1:
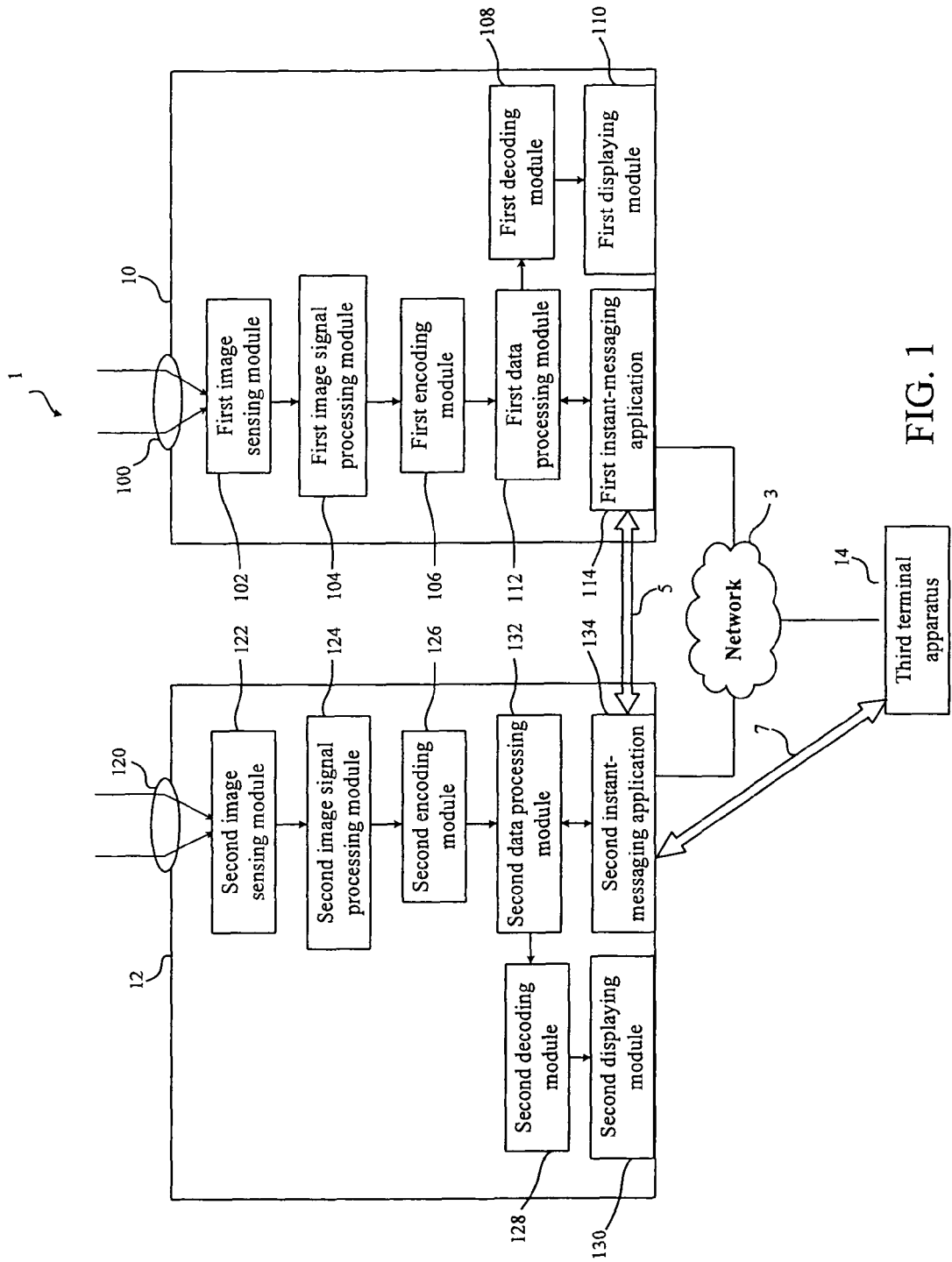
FIG. 1 is a functional block diagram illustrating a three-party video conference system according to an embodiment of the invention.

Please refer FIG. 1. FIG. 1 is a functional block diagram illustrating a three-party video conference system 1 according to an embodiment of the invention. As shown in FIG. 1, the three-party video conference system 1 comprises a first terminal apparatus 10, a second terminal apparatus 12 and a third terminal apparatus 14. The first terminal apparatus 10 comprises a first data processing module 112. The second terminal apparatus 12 comprises a second data processing module 132.

The first data processing module 112 is used for executing a first instant-messaging application 114. The first data processing module 112 transmits a plurality of first compressed digital signals of a first image, captured at the first terminal apparatus 10, via the first instant-messaging application 114 in a first protocol through a first wideband communication channel 5. In practical applications, the first instant-messaging application 114 can be AOL Instant Messenger (AIM), Microsoft MSN Messenger, Yahoo! Messenger, ICQ, Jabber, Groove, Sun JXTA, or the like.

The second data processing module 132 is used for executing a second instant-messaging application 134, wherein the first instant-messaging application 112 communicates with the second instant-messaging application 134 through a network 3 to establish a first communication link over the first wideband communication channel 5. In practical applications, the second instant-messaging application 134 can be AOL Instant Messenger (AIM), Microsoft MSN Messenger, Yahoo! Messenger, ICQ, Jabber, Groove, Sun JXTA, or the like.

In practical applications, the network 3 can be local area network, Intranet, Internet, radio telecommunication network, public switched telephone network, or the like.

In practical applications, the first instant-messaging application 114 and the second instant-messaging application 134 may have an instant-messaging plus respectively for assisting in establishing a first communication link over the first wideband communication channel 5. It should be noticed that the first wideband communication channel 5 can be a special wideband communication channel for transmitting those compressed digital signals.

The second data processing module 132 receives those first compressed digital signals via the second instant-messaging application 134 through the first wideband communication channel 5, and transmits those first compressed digital signals and a plurality of second compressed digital signals of a second image, captured at the second terminal apparatus 12, via the second instant-messaging application 134 in a second protocol through a second wideband communication channel 7. In practical applications, the second protocol can be Session Initiation Protocol (SIP), H.323 protocol, or the like.

The third terminal apparatus 14 is capable of establishing a second communication link with the second terminal apparatus 12 over the second wideband communication channel 7, wherein the third terminal apparatus 14 receives those first compressed digital signals and those second compressed digital signals through the second wideband communication channel 7, and transmits a plurality of third compressed digital signals of a third image, captured at the third terminal apparatus 14 in the second protocol through the second wideband communication channel 7. The second data processing module 132 receives those third compressed digital signals via the second instant-messaging application 134 through the second wideband communication channel 7, and transmits those second compressed digital signals and those third compressed digital signals via the second instant-messaging application 134 in the first protocol through the first wideband communication channel 5. The first data processing module 112 receives those second compressed digital signals and those third compressed digital signals via the first instant-messaging application 114 through the first wideband communication channel 5.

Accordingly, even though the first terminal apparatus 10 and the third terminal apparatus 14 can not transmit those compressed digital signals to each other in the same protocol, those first compressed digital signals and those third compressed digital signals still can be respectively transmitted to the third terminal apparatus 14 and the first terminal apparatus 10 via the second terminal apparatus 12.

In practical applications, the first terminal apparatus 10 further comprises a first lens 100, a first image sensing module 102, a first image signal processing module 104, a first encoding module 106, a first decoding module 108, and a first displaying module 110. In one embodiment, the first data processing module 112 can be implemented into a computer, and the first encoding module 106 and the first decoding module 108 are embedded in the computer. In another embodiment, the first data processing module 112 can be implemented into a computer, and the first lens 100, the first image sensing module 102, the first image signal processing module 104, and the first encoding module 106 can be implemented into a digital imaging/processing device, such as a webcam, capable of being coupled to the computer.

The first lens 100 is used for projecting a first image to the first image sensing module 102. The first image sensing module 102 is used for sensing the first image to generate a plurality of first raw digital signals. In practical applications, the first image sensing module 102 can be a complementary metal-oxide semiconductor (CMOS) sensor, a charge coupled device (CCD) sensor, or the like.

The first image signal processing module 104 is coupled to the first image sensing module 102 and used for processing and transferring those first raw digital signals into a plurality of first usable digital signals. In practical applications, the first image signal processing module 104 can be an image signal processor (ISP) or the like.

The first encoding module 106 is respectively coupled to the first image signal processing module 104 and the first data processing module 112, and is used for compressing those first usable digital signals into a plurality of first compressed digital signals based on a high-definition compression standard and transmitting those first compressed digital signals to the first data processing module 112. In practical applications, the high-definition compression standard can be, but not limited to, H.264 standard, and the first encoding module 106 can be, but not limited to, an H.264 encoder.

It should be noted that the data amount of those first compressed digital signals compressed by the first encoding module 106 is much less than the uncompressed ones, so the load of follow-up transmission and process can be reduced a lot.

The decoding module 108 is coupled to the first data processing module 112 and used for decompressing those second compressed digital signals and those third compressed digital signals in a high-definition compression standard to obtain a plurality of second image signals and a plurality of third image signals. In practical applications, the first encoding module 106 and the first decoding module 108 can be implemented into a codec, such as an H.264 codec. In practical applications, the decoding module 108 also can be implemented into, but not limited to, software.

The displaying module 110 is coupled to the first decoding module 108 and used for displaying those second image signals and those third image signals.

In practical applications, the second terminal apparatus 12 further comprises a second lens 120, a second image sensing module 122, a second image signal processing module 124, a second encoding module 126, a second decoding module 128, and a second displaying module 130. In one embodiment, the second data processing module 132 can be implemented into a computer, and the second encoding module 126 and the second decoding module 128 are implemented into the computer. In another embodiment, the second data processing module 132 can be implemented into a computer, and the second lens 120, the second image sensing module 122, the second image signal processing module 124, and the second encoding module 126 can be implemented into a digital imaging/processing device, such as a webcam, capable of being coupled to the computer.

The second lens 120 is used for projecting a second image to the second image sensing module 122. The second image sensing module 122 is used for sensing the second image to generate a plurality of second raw digital signals. In practical applications, the second image sensing module 122 can be a complementary metal-oxide semiconductor (CMOS) sensor, a charge coupled device (CCD) sensor, or the like.

The second image signal processing module 124 is coupled to the second image sensing module 122 and used for processing and transferring those second raw digital signals into a plurality of second usable digital signals. In practical applications, the second image signal processing module 124 can be an image signal processor (ISP) or the like.

The second encoding module 126 is respectively coupled to the second image signal processing module 124 and the second data processing module 132, and is used for compressing those second usable digital signals into a plurality of second compressed digital signals based on a high-definition compression standard and transmitting those second compressed digital signals to the second data processing module 132. In practical applications, the high-definition compression standard can be, but not limited to, H.264 standard, and the second encoding module 126 can be, but not limited to, an H.264 encoder.

In practical applications, the first data processing module 112 can transmit data via the first instant-messaging application 114, and the second data processing module 132 can receive data via the second instant-messaging application 134 through the network 3. For example, the data can be, but not limited to, a document or an image. Accordingly, the users of using the first instant-messaging application 114 and the second instant-messaging application 134 can communicate with each other via the data. Similarly, the users at the second terminal apparatus 12 and at the third terminal apparatus 14 can communicate with each other via the data. Accordingly, the users can carry out three-party communication via the data.

In practical applications, the first data processing module 112 also can transmit a plurality of audio signals via the first instant-messaging application 114, and the second data processing module 132 can receive those audio signals via the second instant-messaging application 134 through the network 3. Accordingly, the users of using the first instant-messaging application 114 and the second instant-messaging application 134 can communicate with each other via those audio signals. Similarly, the users at the second terminal apparatus 12 and at the third terminal apparatus 14 can communicate with each other via the audio signals. Accordingly, the users can carry out three-party communication via the audio signals.

According to the three-party video conference system of the invention, even though the first terminal apparatus and the third terminal apparatus can not immediately transmit the compressed digital signals with each other with the same protocol, users still can carry out three-party video conferencing communication by using the three-party video conference system and method.

Figure 2A:
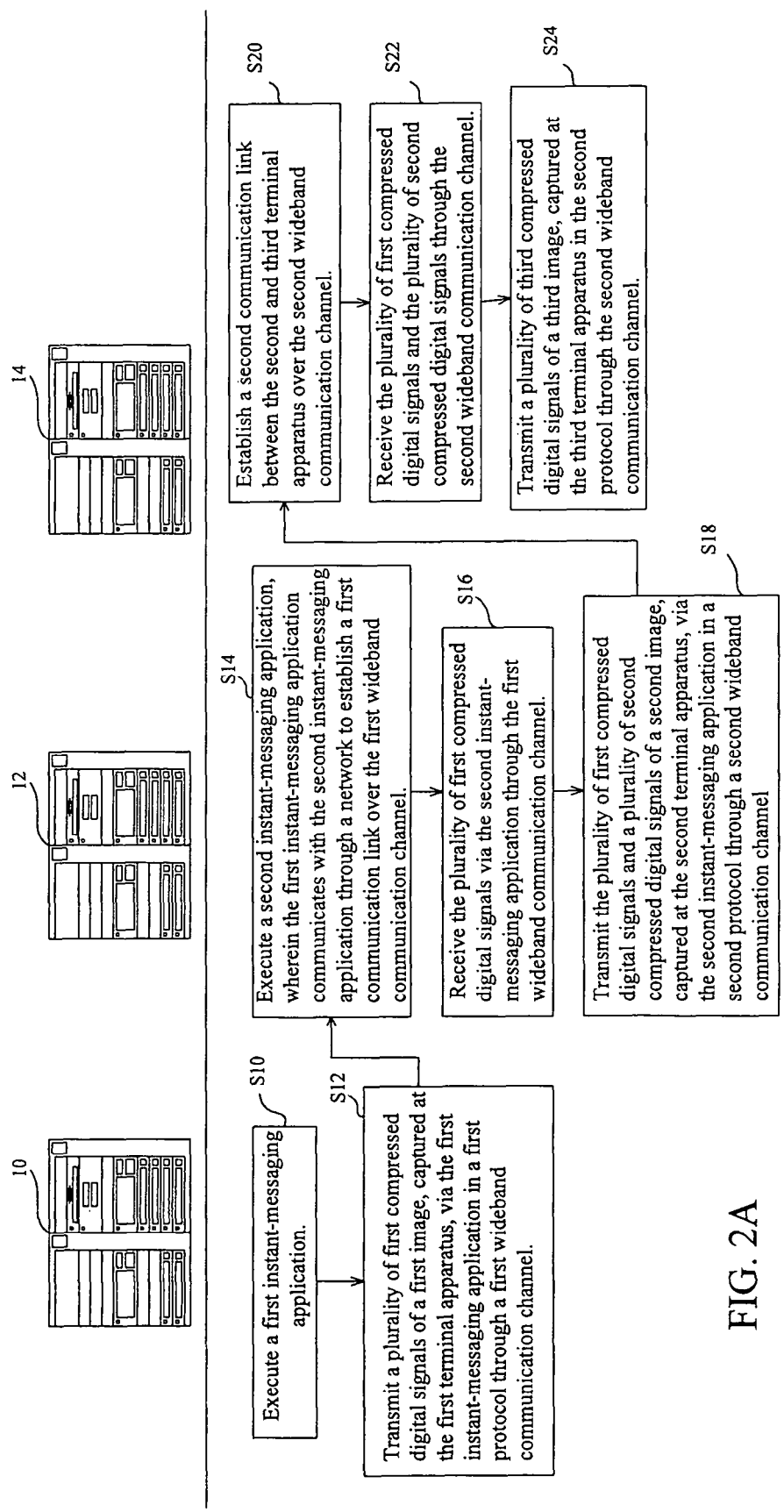
FIG. 2A through FIG. 2D are flow charts showing a three-party video conference method according to an embodiment of the invention.

Please refer to FIG. 2A through FIG. 2D. FIG. 2A through FIG. 2D are flow charts illustrating a three-party video conference method according to an embodiment of the invention. In this embodiment, a first terminal can be arranged as the first terminal apparatus 10 shown in FIG. 1. A second terminal can be arranged as the second terminal apparatus 12 shown in FIG. 1. A third terminal can be arranged as the third terminal apparatus 14 shown in FIG. 1. As shown in FIG. 2A, first of all, step S10 is performed to execute a first instant-messaging application at the first terminal. Step S12 is then performed to transmit a plurality of first compressed digital signals of a first image, captured at the first terminal, via the first instant-messaging application in a first protocol through a first wideband communication channel.

In practical applications, the first instant-messaging application can be AOL Instant Messenger (AIM), Microsoft MSN Messenger, Yahoo! Messenger, ICQ, Jabber, Groove, Sun JXTA, or the like.

Afterward, step S14 is performed to execute a second instant-messaging application at the second terminal, wherein the first instant-messaging application communicates with the second instant-messaging application through a network to establish a first communication link over the first wideband communication channel. Step S16 is then performed to receive those first compressed digital signals at the second terminal via the second instant-messaging application through the first wideband communication channel. In practical applications, the second instant-messaging application can be AOL Instant Messenger (AIM), Microsoft MSN Messenger, Yahoo! Messenger, ICQ, Jabber, Groove, Sun JXTA, or the like.

In practical applications, the network can be local area network, Intranet, Internet, radio telecommunication network, public switched telephone network, or the like.

In practical applications, the first instant-messaging application and the second instant-messaging application may have an instant-messaging plus respectively for assisting in establishing a first communication link over the first wideband communication channel. It should be noticed that the first wideband communication channel can be a special wideband communication channel for transmitting those compressed digital signals.

Afterward, at the second terminal, step S18 is performed to transmit those first compressed digital signals and a plurality of second compressed digital signals of a second image, captured at the second terminal, via the second instant-messaging application in a second protocol through a second wideband communication channel. In practical applications, the second protocol can be Session Initiation Protocol (SIP), H.323 protocol, or the like.

Afterward, at the third terminal, step S20 is performed to establish a second communication link between the second and third terminal apparatus over the second wideband communication channel. Step S22 is then performed to receive those first compressed digital signals and those second compressed digital signals at the third terminal through the second wideband communication channel. Finally, step S24 is performed to transmit a plurality of third compressed digital signals of a third image, captured at the third terminal, in the second protocol through the second wideband communication channel.

Figure 2B:
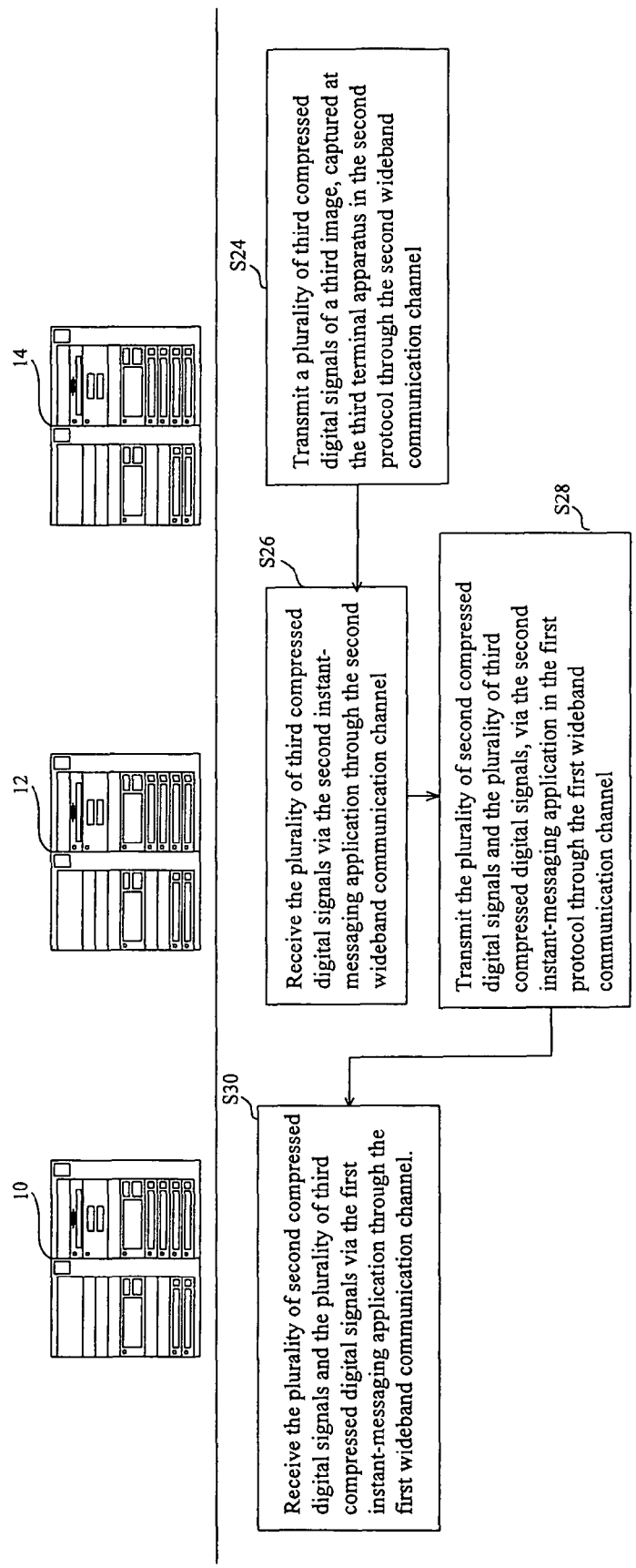

As shown in FIG. 2B, in practical applications, the three-party video conference method further comprises the following steps. First of all, step S26 is performed to receive those third compressed digital signals at the second terminal via the second instant-messaging application through the second wideband communication channel. Step S28 is then performed to transmit those second compressed digital signals and those third compressed digital signals at the second terminal via the second instant-messaging application in the first protocol through the first wideband communication channel. Step S30 is then performed to receive those second compressed digital signals and those third compressed digital signals via the first instant-messaging application through the first wideband communication channel.

Figure 2C:
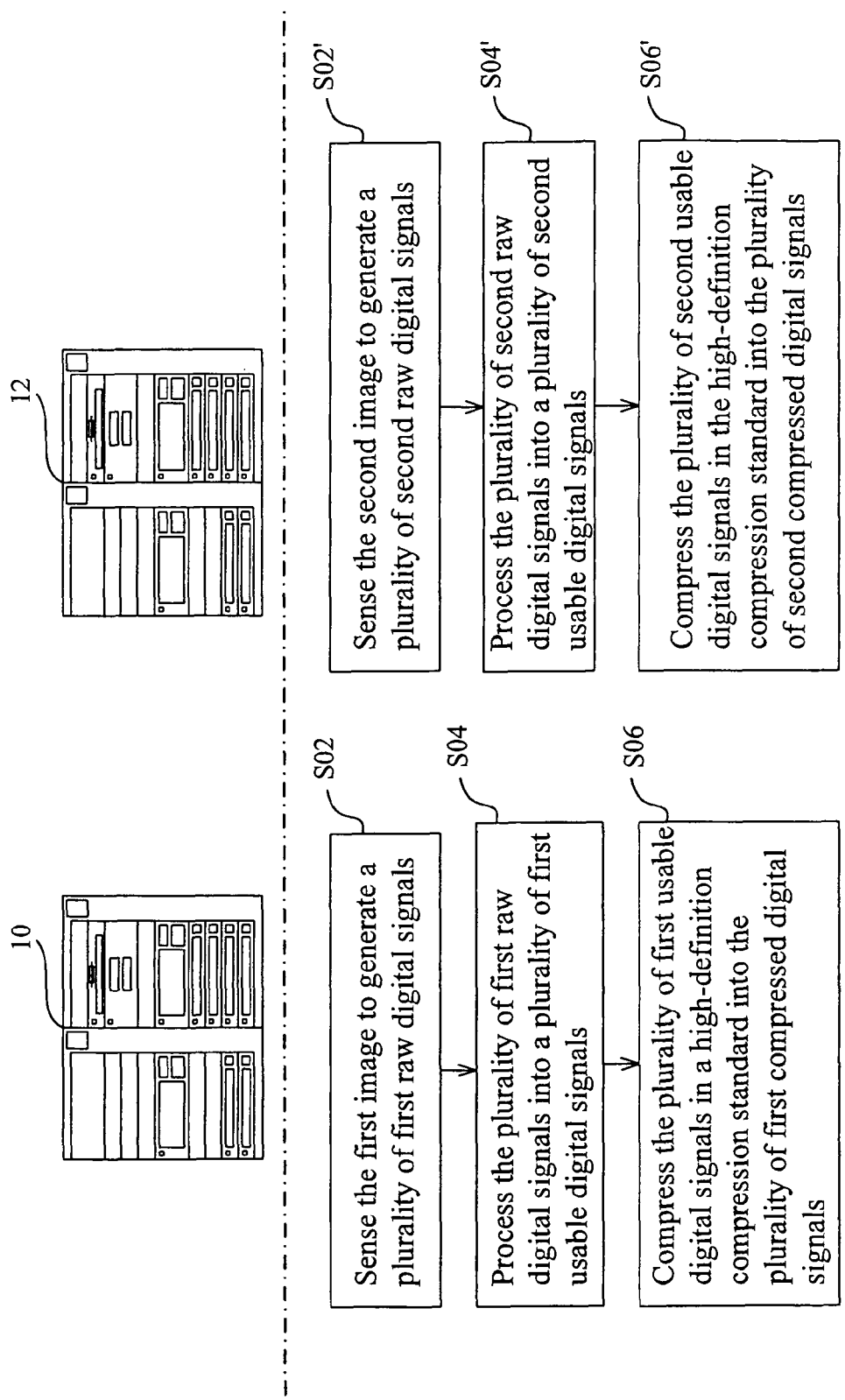

In practical applications, in order to retrieve those first compressed digital signals, the three-party video conference method further comprises the following steps. As shown in FIG. 2C, first of all, step S02 is performed to sense the first image at the first terminal to generate a plurality of first raw digital signals. Step S04 is then performed to process those first raw digital signals at the first terminal into a plurality of first usable digital signals. At the first terminal, step S06 is then performed to compress those first usable digital signals in a high-definition compression standard into those first compressed digital signals. In practical applications, the high-definition compression standard can be H.264 standard or the like.

In practical applications, in order to retrieve those first compressed digital signals, the three-party video conference method further comprises the following steps. As shown in FIG. 2C, first of all, step S02' is performed to sense the second image to generate a plurality of second raw digital signals at the second terminal. Step S04' is then performed to process those second raw digital signals into a plurality of second usable digital signals at the second terminal. Step S06' is then performed to compress those second usable digital signals in the high-definition compression standard into those second compressed digital signals at the second terminal.

It should be noted that the data amount of those first compressed digital signals and those second compressed digital signals data are much less than the uncompressed ones, so the load of follow-up transmission and process can be reduced a lot.

Figure 2D:
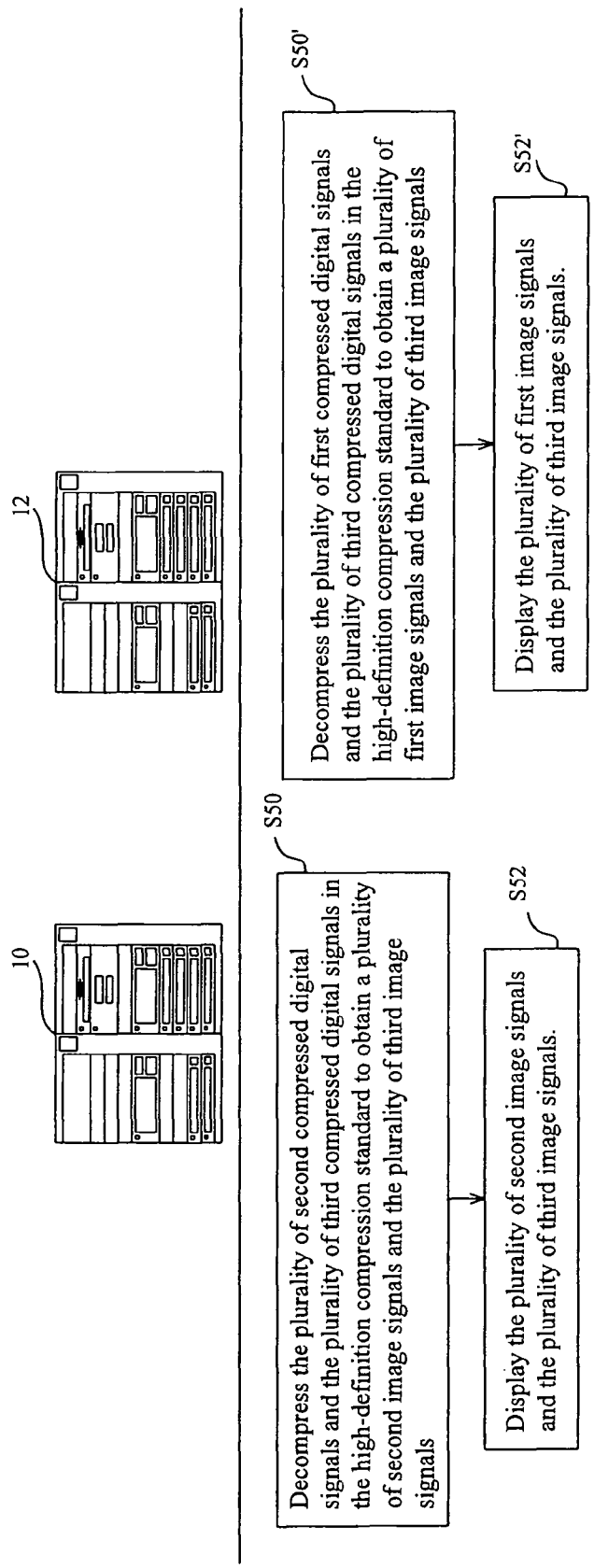

In practical applications, in order to display those image signals at the first terminal, the three-party video conference method further comprises the following steps. As shown in FIG. 2D, first of all, at the first terminal, step S50 is performed to decompress those second compressed digital signals and those third compressed digital signals in the high-definition compression standard to obtain a plurality of second image signals and those third image signals. Step S52 is then performed to display those second image signals and those third image signals at the first terminal.

In practical applications, in order to display those image signals at the second terminal, the three-party video conference method further comprises the following steps. As shown in FIG. 2D, first of all, at the first terminal, step S50' is performed to decompress those first compressed digital signals and those third compressed digital signals in the high-definition compression standard to obtain a plurality of first image signals and those third image signals. Step S52' is then performed to display those first image signals and those third image signals at the second terminal.

Figure 3:
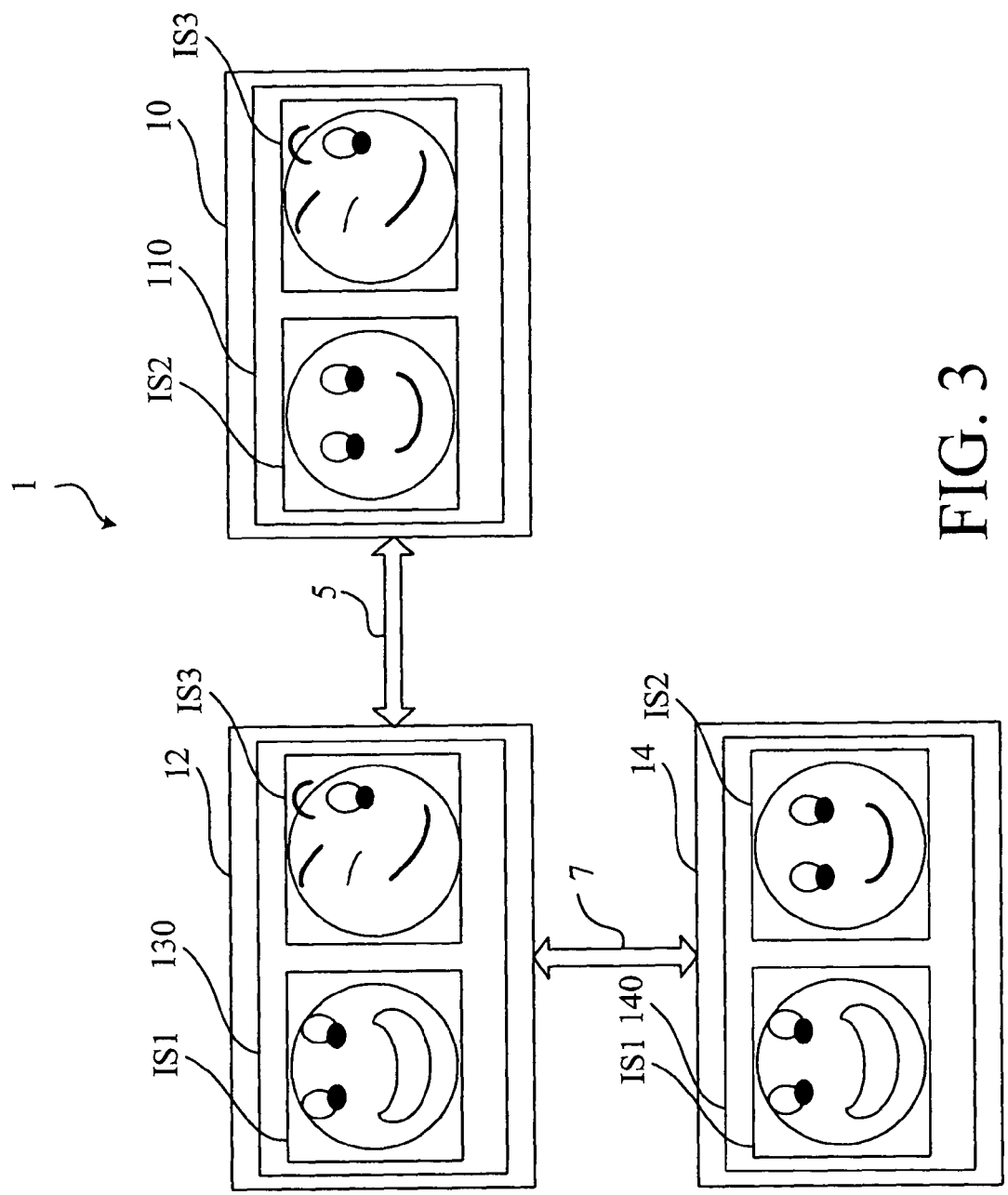
FIG. 3 is schematic diagram illustrating a proceeding of three-party video conference.

Please refer to FIG. 3. FIG. 3 is schematic diagram illustrating a proceeding of three-party video conference. As shown in FIG. 3, the users can utilize one embodiment of the three-party video conference system 1 of the invention to carry out three-party video conferencing communication. In other words, the first terminal apparatus 10 can receive those second compressed digital signals and those third compressed digital signals, and decompress those second compressed digital signals and those third compressed digital signals to obtain those second image signals IS2 and those third image signals IS3. The first terminal apparatus 10 still can display those second image signals IS2 and those third image signals IS3 by using the first displaying module 110, as shown in FIG. 3. Similarly, the second terminal apparatus 12 can display those first image signals IS1 and those third image signals IS3 by using the second displaying module 130, as shown in FIG. 3. Similarly, the third terminal apparatus 14 can display those first image signals IS1 and those second image signals IS2 by using the third displaying module 140, as shown in FIG. 3.

Compared with the prior art, the three-party video conference system and method of the invention utilize a second terminal apparatus, which can transmit data in different protocols, for receiving and transmitting the compressed digital signals transmitted from a first terminal apparatus and a third terminal apparatus. Therefore, even though the first terminal apparatus and the third terminal apparatus can not transmit compressed digital signals to each other with the same protocol, the user still can use the three-party video conference system to achieve three-party video conferencing communication. Besides, the data amount of those compressed digital signals compressed by the encoding module are much less than uncompressed ones, so the load of follow-up transmission and process can be reduced a lot. Accordingly, the three-party video conference system and method of the invention can achieve a high-definition video conferencing standard even under limited hardware performance and network transmission bandwidth.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A three-party video conference system, comprising: a first terminal apparatus, comprising: a first data processing module for executing a first instant-messaging application, the first data processing module transmitting a plurality of first compressed digital signals of a first image, captured at the first terminal apparatus, via the first instant-messaging application in a first protocol through a first wideband communication channel; a second terminal apparatus, comprising: a second data processing module for executing a second instant-messaging application, wherein the first instant-messaging application communicates with the second instant-messaging application through a network to establish a first communication link over the first wideband communication channel, the second data processing module receives the plurality of first compressed digital signals via the second instant-messaging application through the first wideband communication channel, and transmits the plurality of first compressed digital signals and a plurality of second compressed digital signals of a second image, captured at the second terminal apparatus, via the second instant-messaging application in a second protocol through a second wideband communication channel; and a third terminal apparatus, capable of establishing a second communication link with the second terminal apparatus over the second wideband communication channel, wherein the third terminal apparatus receives the plurality of first compressed digital signals and the plurality of second compressed digital signals through the second wideband communication channel, and transmits a plurality of third compressed digital signals of a third image, captured at the third terminal apparatus in the second protocol through the second wideband communication channel, and wherein the second data processing module receives the plurality of third compressed digital signals via the second instant-messaging application through the second wideband communication channel, and transmits the plurality of second compressed digital signals and the plurality of third compressed digital signals, via the second instant-messaging application in the first protocol through the first wideband communication channel, the first data processing module receives the plurality of second compressed digital signals and the plurality of third compressed digital signals via the first instant-messaging application through the first wideband communication channel.

2. The three-party video conference system of claim 1, wherein the first terminal apparatus also comprises: a first image sensing module for sensing the first image to generate a plurality of first raw digital signals; a first image signal processing module, coupled to the first image sensing module, for processing and transferring the plurality of first raw digital signals into a plurality of first usable digital signals; a first encoding module, coupled to the first image signal processing module and the first data processing module, respectively, for compressing the plurality of first usable digital signals in a high-definition compression standard into the plurality of first compressed digital signals, and transmitting the plurality of first compressed digital signals to the first data processing module; a first decoding module, coupled to the first data processing module, for decompressing the plurality of second compressed digital signals and the plurality of third compressed digital signals in the high-definition compression standard to obtain a plurality of second image signals and a plurality of third image signals; and a first displaying module, coupled to the first decoding module, for displaying the plurality of second image signals and the plurality of third image signals.

3. The three-party video conference system of claim 2, wherein the second terminal apparatus also comprises: a second image sensing module for sensing the second image to generate a plurality of second raw digital signals; a second image signal processing module, coupled to the second image sensing module, for processing and transferring the plurality of second raw digital signals into a plurality of second usable digital signals; a second encoding module, coupled to the second image signal processing module and the second data processing module, respectively, for compressing the plurality of second usable digital signals in the high-definition compression standard into the plurality of second compressed digital signals, and transmitting the plurality of second compressed digital signals to the second data processing module; a second decoding module, coupled to the second data processing module, for decompressing the plurality of first compressed digital signals and the plurality of third compressed digital signals in the high-definition compression standard to obtain a plurality of first image signals and the plurality of third image signals; and a second displaying module, coupled to the second decoding module, for displaying the plurality of first image signals and the plurality of third image signals.

4. The three-party video conference system of claim 3, wherein the high-definition compression standard is an H.264 standard.

5. The three-party video conference system of claim 3, wherein each of the first and second instant-messaging applications is one selected from a group consisting of AOL Instant Messenger, Microsoft MSN Messenger, Yahoo! Messenger, ICQ, Jabber, Groove, and Sun JXTA.

6. The three-party video conference system of claim 3, wherein the second protocol is a Session Initiation Protocol (SIP) or an H.323 protocol.

7. The three-party video conference system of claim 3, wherein the network is one selected from a group consisting of a local area network, an Intranet, an Internet, a radio telecommunication network, and a public switched telephone network.

8. A three-party video conference method, comprising steps of: at a first terminal, performing steps of: executing a first instant-messaging application; and transmitting a plurality of first compressed digital image signals of a first image, captured at the first terminal, via the first instant-messaging application in a first protocol through a first wideband communication channel; at a second terminal, performing steps of: executing a second instant-messaging application, wherein the first instant-messaging application communicates with the second instant-messaging application through a network to establish a first communication link over the first wideband communication channel; receiving the plurality of first compressed digital signals via the second instant-messaging application through the first wideband communication channel; and transmitting the plurality of first compressed digital signals and a plurality of second compressed digital signals of a second image, captured at the second terminal, via the second instant-messaging application in a second protocol through a second wideband communication channel; at a third terminal, performing the steps of establishing a second communication link between the second terminal and the third terminal over the second wideband communication channel; receiving the plurality of first compressed digital signals and the plurality of second compressed digital signals through the second wideband communication channel; and transmitting a plurality of third compressed digital signals of a third image captured at the third terminal in the second protocol through the second wideband communication channel.

9. The three-party video conference method of claim 8, at the second terminal, further comprising steps of: receiving the plurality of third compressed digital signals via the second instant-messaging application through the second wideband communication channel; and transmitting the plurality of second compressed digital signals and the plurality of third compressed digital signals, via the second instant-messaging application in the first second protocol through the first wideband communication channel.

10. The three-party video conference method of claim 9, at the first terminal, further comprising step of: receiving the plurality of second compressed digital signals and the plurality of third compressed digital signals via the first instant-messaging application through the first wideband communication channel.

11. The three-party video conference method of claim 9, at the first terminal, further comprising steps of: sensing the first image to generate a plurality of first raw digital signals; processing the plurality of first raw digital signals into a plurality of first usable digital signals; compressing the plurality of first usable digital signals in a high-definition compression standard into the plurality of first compressed digital signals; decompressing the plurality of second compressed digital signals and the plurality of third compressed digital signals in the high-definition compression standard to obtain a plurality of second image signals and a plurality of third image signals; and displaying the plurality of second image signals and the plurality of third image signals.

12. The three-party video conference method of claim 11, at the second terminal, further comprising steps of: sensing the second image to generate a plurality of second raw digital signals; processing the plurality of second raw digital signals into a plurality of second usable digital signals; compressing the plurality of second usable digital signals in the high-definition compression standard into the plurality of second compressed digital signals;
decompressing the plurality of first compressed digital signals and the plurality of third compressed digital signals in the high-definition compression standard to obtain a plurality of first image signals and the plurality of third image signals; and displaying the plurality of first image signals and the plurality of third image signals.

13. The three-party video conference method of claim 12, wherein the high-definition compression standard is an H.264 standard.

14. The three-party video conference method of claim 12, wherein each of the first and second instant-messaging applications is one selected from a group consisting of AOL Instant Messenger, Microsoft MSN Messenger, Yahoo! Messenger, ICQ, Jabber, Groove, and Sun JXTA.

15. The three-party video conference method of claim 12, wherein the second protocol is a Session Initiation Protocol (SIP) or an H.323 protocol.

16. The three-party video conference method of claim 12, wherein the network is one selected from a group consisting of a local area network, an Intranet, an Internet, a radio telecommunication network, and a public switched telephone network.

\* \* \* \* \*